Patented Sept. 20, 1932

1,878,903

UNITED STATES PATENT OFFICE

IRA T. SMITH, OF BOOKER, TEXAS

ANTIFREEZE SOLUTION

No Drawing.    Application filed January 18, 1932. Serial No. 587,450.

The invention relates to anti-freeze solutions and processes for making the same.

The invention particularly relates to the production of a solution of this type from a brine solution as the main component which has mixed therein and incorporated as essential components thereof, glycerine, a dissolvant thereof such as wood or denatured alcohol and liquid coffee.

While a brine formed by dissolving calcium chloride in water is well known as a solution which remains liquid at relatively low temperatures—below 40° below zero, Fahrenheit scale—, still it is well known that such a brine has certain detrimental effects upon the metal objects or parts exposed thereto. It is also well known that there is no characteristic inherent to the brine which tends to avoid or prevent the formation of objectionable deposits such as lime deposits that are likely to be experienced in certain localities.

The ingredients which applicant adds to his brine have combined effects which impart to the solution certain favorable characteristics.

The solution which is the subject of the present invention tends to absorb and thereby remove rust from the section containing the solution, it tends to prevent the formation of rust in said section and also to prevent the formation of lime deposits and all of this, without injury to the metal parts with which the solution contacts.

A preferred mode of realizing the invention is hereinafter described but it will be understood that, according to the broader aspects thereof, the invention is not limited to the exact proportions herein specified, but the proportions may be varied depending upon the commercial characteristics of the particular ingredients employed and also upon the characteristics of the service for which the particular solution is intended.

A preferred formula for producing the solution is as follows; namely, for producing 100 gallons of the solution, there is employed one-half gallon of glycerine, one-half gallon of wood or denatured alcohol, 260 pounds of calcium chloride and liquid coffee derived from thoroughly boiling two pounds of coffee—Peaberry coffee—, the coffee being boiled three times, each time in five gallons of water and then adding enough water to make the 100 gallons.

In the preferred form of carrying out the invention, a heavy brine is first produced by dissolving the calcium chloride in water. Thereto, there is mixed the glycerine, preferably mixed in and dissolved by one-half gallon of the alcohol, and, into brine in which the glycerine-alcohol mixture has been incorporated, there is supplied the liquid extracts derivable from the coffee by the boiling methods above outlined.

Applicant believes that a chemical reaction takes place when the elements are brought together. This is evidenced by the fact that the resulting liquid becomes hot and foams to a certain extent.

Some of the characteristics of the solution which results from carrying out the process above described, are as follows:

The solution will not freeze at 40° below zero—Fahrenheit scale—.

The solution dissolves all lime in the radiator, if used in an automobile radiator, and removes and prevents rusting therein.

The solution does not have an injurious effect on the metal parts with which it comes in contact. Moreover, it does not effect the paint or enamel on the hood of automobiles, or elsewhere.

The solution serves as a good defroster in that it readily removes ice from the windshield of an automobile and tends to prevent the forming of ice on the windshield when the solution is applied thereto.

It can be produced at relatively low cost and is less volatile than water.

It is difficult to state with certainty all the functional advantages incident to the use of the coffee but applicant believes the coffee is the dissolving agent, or an essential part thereof, that dissolves and prevents the formation of lime.

The purpose of the glycerine is to oil the surface with which it comes in contact and in this way, it largely prevents the formation of rust.

As above indicated, the alcohol thins or dissolves the glycerine.

What is claimed is:

1. The process of forming an anti-freeze solution which comprises producing a brine by dissolving 260 pounds of calcium chloride in water, adding to the brine one gallon of glycerine dissolved in one-half gallon of alcohol and mixing into the brine a solution of coffee extract derived by boiling two pounds of coffee in water, and adding sufficient water to make 100 gallons.

2. The process of forming a solution of the class and for the purposes described which comprises mixing with a heavy brine solution of glycerine, alcohol and the liquid extracts derivable from coffee by boiling the same in water.

3. In the forming of an anti-freeze solution the process which comprises the mixing of water, glycerine, calcium chloride, alcohol and liquid extracts derivable from coffee.

4. An anti-freeze solution comprising a mixture of water, salt, glycerine, alcohol and coffee extract.

5. An anti-freeze solution comprising 260 pounds of calcium chloride, in approximately 100 gallons of water, one-half gallon of glycerine, one-half gallon of alcohol, and the liquid extracts derivable from coffee.

In testimony whereof, I have hereunto set my hand this 9th day of January, 1932.

IRA T. SMITH.